US012773901B2

(12) United States Patent
Kawanishi et al.

(10) Patent No.: US 12,773,901 B2
(45) Date of Patent: Oct. 27, 2026

(54) COOLING CONTROL SYSTEM FOR ELECTRIC VEHICLE

(71) Applicant: TOYOTA JIDOSHA KABUSHIKI KAISHA, Toyota (JP)

(72) Inventors: Hiroshi Kawanishi, Nisshin (JP); Atsushi Tabata, Okazaki (JP); Koichi Okuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 306 days.

(21) Appl. No.: 18/741,946

(22) Filed: Jun. 13, 2024

(65) Prior Publication Data

US 2025/0018785 A1 Jan. 16, 2025

(30) Foreign Application Priority Data

Jul. 12, 2023 (JP) ................................ 2023-114733

(51) Int. Cl.

*B60K 11/02* (2006.01)
*B60K 1/02* (2006.01)
*B60W 10/08* (2006.01)
*B60W 30/184* (2012.01)
*B60K 1/00* (2006.01)

(52) U.S. Cl.

CPC ................ *B60K 11/02* (2013.01); *B60K 1/02* (2013.01); *B60W 10/08* (2013.01); *B60W 30/1843* (2013.01); *B60K 2001/001* (2013.01); *B60K 2001/006* (2013.01); *B60W 2400/00* (2013.01); *B60W 2510/30* (2013.01); *B60W 2710/083* (2013.01)

(58) Field of Classification Search

CPC .... B60K 1/02; B60K 11/02; B60K 2001/001; B60K 2001/006; B60W 10/08; B60W 10/30; B60W 30/1843; B60W 2400/00; B60W 2510/30; B60W 2710/083

See application file for complete search history.

(56) References Cited

U.S. PATENT DOCUMENTS

| | | | | |
|---|---|---|---|---|
| 6,243,638 | B1 * | 6/2001 | Abo | F16H 61/66254 474/18 |
| 2006/0272869 | A1 * | 12/2006 | Hidaka | F16H 61/0028 180/65.25 |
| 2017/0219085 | A1 * | 8/2017 | Kiyokami | F16H 57/0441 |
| 2021/0107456 | A1 * | 4/2021 | Kim | B60K 17/354 |
| 2024/0426376 | A1 * | 12/2024 | Okuno | F16H 61/0031 |

FOREIGN PATENT DOCUMENTS

| | | |
|---|---|---|
| JP | 2015168300 A | 9/2015 |
| JP | 2019123387 A | 7/2019 |

* cited by examiner

*Primary Examiner* — Edwin A Young

(74) *Attorney, Agent, or Firm* — Hunton Andrews Kurth LLP

(57) ABSTRACT

A cooling control system for an electric vehicle configured to prevent ingestion of air into an oil pump cooling a motor when the electric vehicle is accelerated or decelerated abruptly. A controller includes: a detector that detects acceleration and deceleration of the electric vehicle; an abrupt acceleration/deceleration determiner that determines that the acceleration or the deceleration exceeds than a threshold; and an oil reducer that reduces an amount of oil supplied from an oil pump to a motor where the lighter load than the load on another motor is applied, when the acceleration or the deceleration exceeds the threshold.

12 Claims, 6 Drawing Sheets

COOLING CONTROL SYSTEM FOR ELECTRIC VEHICLE

CROSS-REFERENCE TO RELATED APPLICATIONS

The present disclosure claims the benefit of Japanese Patent Application No. 2023-114733 filed on Jul. 12, 2023 with the Japanese Patent Office.

BACKGROUND

Field of the Invention

Embodiments of the present disclosure relate to the art of a control system for cooling an electric motor serving as a prime mover of an electric vehicle, and more specifically, to a control system for cooling the electric motor by oil.

Discussion of the Related Art

JP-A-2015-168300 discloses one example of a vehicle having a motor. The vehicle described in JP-A-2015-168300 comprises an engine and a motor having a generating function (i.e., a motor-generator). In the vehicle described in JP-A-2015-168300, specifically, front wheels are driven by the engine and the motor, and rear wheels are driven by another motor. That is, an operating mode of the vehicle described therein may be selected from: a two-wheel drive mode in which the front wheels are driven by the engine and the motor; and a four-wheel drive mode in which the front wheels are driven by the engine and the motor and the rear wheels are driven by another motor. According to the teachings of JP-A-2015-168300, the front wheels may also be driven only by the motor while stopping the engine. In this case, the vehicle described therein is operated as a battery electric vehicle.

In the electric vehicles, sometimes large current is applied to the motor in response to a drive demand and a regeneration demand. In addition, the motor is heated inevitably due to iron loss and a Joule loss, and an amount of heat generation of the motor increases with an increase in the current applied thereto. If a temperature of the motor rises excessively, the motor would be damaged and durability of the motor would be reduced. In addition, an output of the motor would be restricted. Therefore, in order to avoid such disadvantages, it is necessary to cool the motors of the electric vehicles. For example, a hydraulic device of a hybrid vehicle described in JP-A-2019-123387 is configured to supply oil to a transmission and a motor during propulsion in an electric vehicle mode by activating an electric oil pump.

In the vehicle described in JP-A-2015-168300, the motor for driving the front wheels and the motor for driving the rear wheels are controlled independently and operated in different conditions. For example, those motors may be cooled by pumping up the oil using the electric oil pump as described in JP-A-2019-123387. To this end, a cooling device or a cooling unit having the electric oil pump described in JP-A-2019-123387 has to be arranged for each of those motors.

However, in order to cool the motor driving the front wheels and the motor driving the rear wheels independently, the following problems still remain. In the electric vehicle, a level of the oil for cooling the motor and lubricating contact sites is raised and lowered by an inertial force derived from acceleration and deceleration of the electric vehicle. For example, if a level of the oil in an oil pan is lowered, a suction inlet or a strainer will be exposed from the oil to the air. As a result, the oil pump would suck air and an oil supply to the motor and the contact sites would be reduced from required amounts. That is, the oil pump may not be cooled sufficiently, and the contact sites may not be lubricated sufficiently.

Thus, the above-mentioned technical problems still remain in the electric vehicle in which the front wheels and the rear wheels are driven and regeneratively braked by the dedicated motors, and in which those motors are cooled by the dedicated oil pumps. However, such technical problems of the have not yet been considered, therefore, suitable solutions for such technical problems have not yet been available in the art.

The above-mentioned technical problems may be solved by increasing an oil amount in the oil pan so as to maintain the oil level in the oil pan to a certain level even when the electric vehicle is accelerated or decelerated. However, if the oil amount is increased, a total weight of the electric vehicle will be increased thereby reducing an energy efficiency (that is, consuming more electricity)

SUMMARY

Aspects of embodiments of the present disclosure have been conceived noting the foregoing technical problems, and it is therefore an object of the present disclosure to provide a cooling control system for an electric vehicle configured to prevent ingestion of air into an oil pump to cool a motor properly, and to reduce a weight of the electric vehicle to improve an energy efficiency (i.e., an electric mileage).

The cooling control system according to the exemplary embodiment of the present disclosure is applied to an electric vehicle comprising: a first motor that drives front wheels; a first oil pump that supplies oil to the first motor; a second motor that drives rear wheels; and a second oil pump that supplies oil to the second motor. In the electric vehicle, a load on the second motor is increased greater than a load on the first motor when the electric vehicle is accelerated, and the load on the first motor is increased greater than the load on the second motor when the electric vehicle is decelerated. In order to achieve the above-explained objectives, according to the exemplary embodiment of the present disclosure, the cooling control system is provided with a controller that controls the first oil pump and the second oil pump. Specifically, the controller comprises: a detector that is configured to detect at least any one of acceleration and deceleration of the electric vehicle while the electric vehicle is propelled by the first motor and the second motor; an abrupt acceleration/deceleration determiner that is configured to determine that the acceleration or the deceleration detected by the detector is greater than a predetermined threshold value; and an oil reducer that is configured to reduce an amount of the oil supplied from one of the first oil pump and the second oil pump which supplies the oil to one of the first motor and the second motor where the lighter load than the load on an other of the motors is applied, when the abrupt acceleration/deceleration determiner determines that the acceleration or the deceleration is greater than the threshold value.

In a non-limiting embodiment, the first motor and the second motor may include a motor-generator. In addition, the load may include: output torques of the first motor and the second motor; and regenerative braking torques resulting from power generation by the first motor and the second motor.

In a non-limiting embodiment, the oil reducer may be further configured to reduce the amount of the oil supplied from the first oil pump to the first motor when the abrupt acceleration/deceleration determiner determines that the acceleration is greater than the threshold value.

In a non-limiting embodiment, the oil reducer may be further configured to reduce the amount of the oil supplied from the second oil pump to the second motor when the abrupt acceleration/deceleration determiner determines that the deceleration is greater than the threshold value.

In a non-limiting embodiment, the oil reducer may be further configured to reduce the amount of the oil supplied to the one of the first motor and the second motor by reducing a speed of the one of the first oil pump and the second oil pump.

In a non-limiting embodiment, the controller may further comprise a torque controller that is configured to reduce the output torque of the first motor when the amount of the oil supplied from the first oil pump to the first motor is reduced.

In a non-limiting embodiment, the controller may further comprise a torque controller that is configured to reduce the output torque of the second motor when the amount of the oil supplied from the second oil pump to the second motor is reduced.

Thus, according to the exemplary embodiment of the present disclosure, the cooling control system reduces an amount of the oil supplied to one of the motors where the lighter load than the load on the other motor. For example, in a case that the electric vehicle is accelerated abruptly, the output torque of the second motor is increased but the output torque of the first motor is not increased. In this case, therefore, the load on the first motor is lighter than the load on the second motor. By contrast, in a case that the electric vehicle is decelerated abruptly, the braking force is established by the first motor. In this case, therefore, the load on the first motor is increased greater than the load on the second motor. When the electric vehicle is accelerated or decelerated abruptly, an oil levels in an oil pan will fluctuate thereby lowering the oil level in the vicinity of a suction inlet of the oil pump. However, since the amount of the oil pumped up by the oil pump the load thereon is reduced, the oil level in the oil pan will not be further lowered. For this reason, ingestion of air into the oil pump may be reduced or prevented even if the suction inlet of the oil pump is exposed to the air. That is, in the electric vehicle to which the cooling system according to the exemplary embodiment of the present disclosure is applied, it is not necessary to increase an amount of the oil in the oil pan. According to the exemplary embodiment of the present disclosure, therefore, a total weight of the electric vehicle may be lightened so that an energy efficiency (i.e., an electric mileage) of the electric vehicle is improved.

In addition, according to the exemplary embodiment of the present disclosure, the torque controller reduces the output torque of the motor where the oil supply thereto is reduced. According to the exemplary embodiment of the present disclosure, therefore, the motor where the oil supply thereto is reduced still can be cooled by the oil, and in addition, heat generation of such motor can be suppressed. For this reason, temperature rise of the motors and the oil can be suppressed.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Embodiments of the present disclosure will now be explained with reference to the accompanying drawings. Note that the embodiments shown below are merely examples of the present disclosure which should not limit a scope of the present disclosure.

Figure 1:
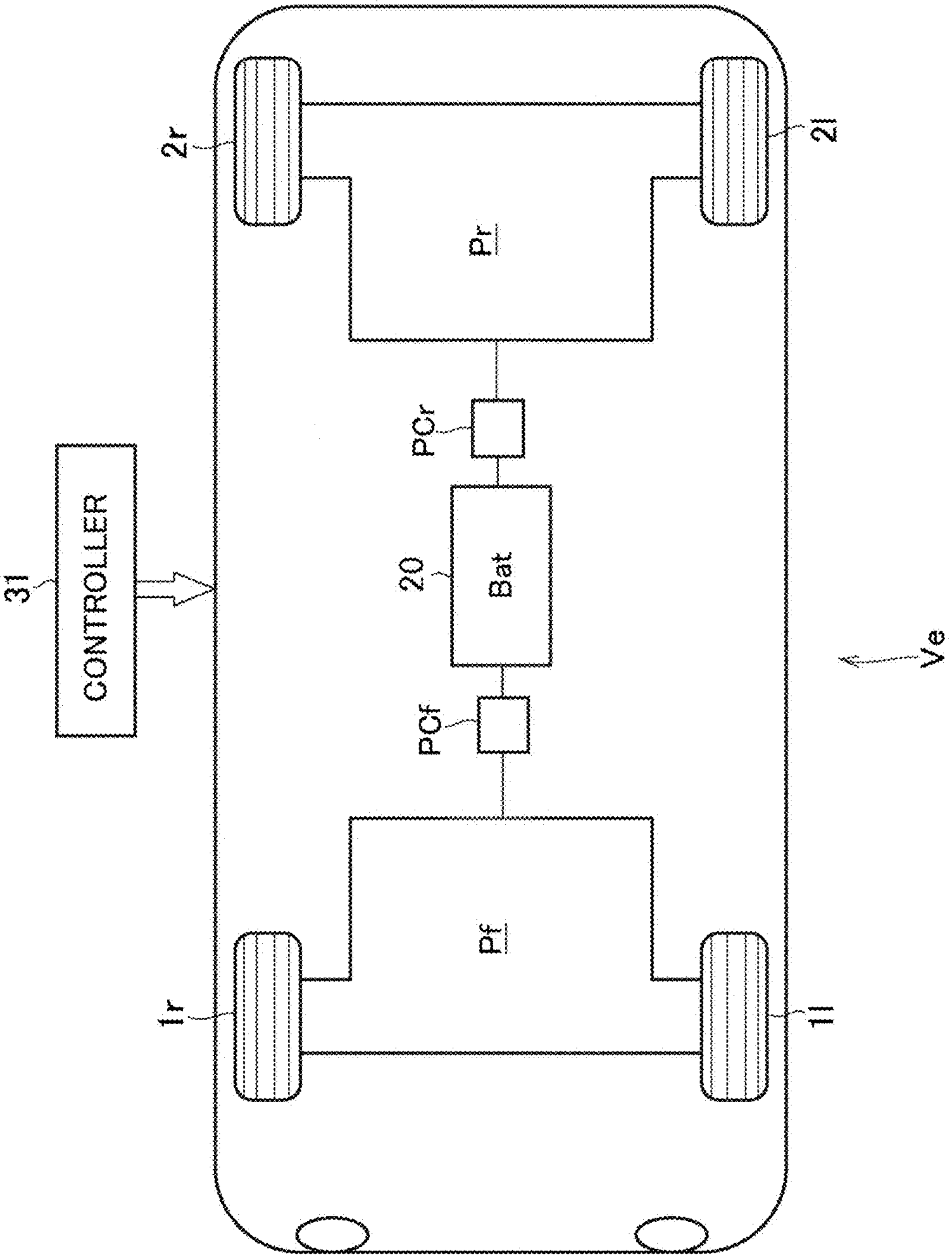
FIG. 1 is a schematic illustration showing one example of a powertrain of a four-wheel independent drive electric vehicle according to the exemplary embodiment of the present disclosure.

The cooling control system according to the exemplary embodiment of the present disclosure is applied to a vehicle in which a pair of front wheels is driven by a dedicated prime mover, and a pair of rear wheels is driven by another dedicated prime mover. That is, the vehicle to which the cooling control system according to the exemplary embodiment of the present disclosure is applied comprises four wheels in total, and the front wheels and the rear wheels are driven separately by their own dedicated prime movers. In the vehicle, the front wheels may be connected to the front prime mover through a differential mechanism, and the rear wheels may be connected to the rear prime mover through another differential mechanism. In addition, the control system according to the exemplary embodiment of the present disclosure may also be applied to a vehicle in which driving torques and regenerative braking torques of the wheels may be controlled independently or separately. Referring now to FIG. 1, there is shown one example of a structure of a four-wheel independent drive layout vehicle to which the cooling control system according to the exemplary embodiment of the present disclosure is applied. In the vehicle Ve shown in FIG. 1, driving torques and regenerative braking torques of wheels may be controlled independently. That is, all of the wheels are driven separately or independently by their own dedicated prime movers. As schematically illustrated in FIG. 1, the vehicle Ve comprises: a pair of front wheels 1*r* and 1*l*; a pair of rear wheels 2*r* and 2*l*; a front drive unit Pf serving as a prime mover to drive the front wheels 1*r* and 1*l*; and a rear drive unit Pr serving as a prime mover to drive the rear wheels 2*r* and 2*l*. Each of the front drive unit Pf and the rear drive unit Pr comprises a motor and a geared reduction mechanism (i.e., a transmission mechanism).

Figure 2:
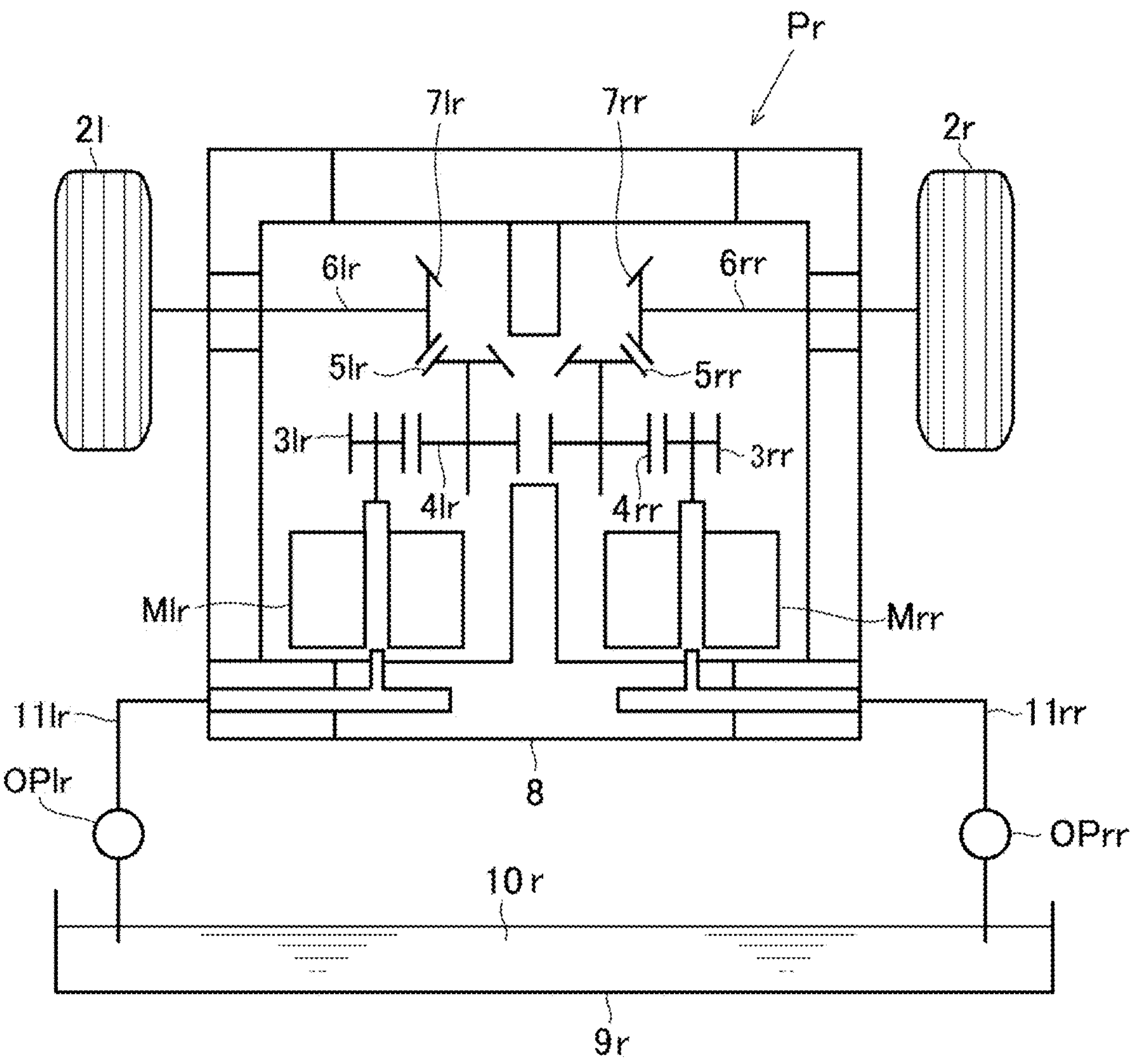
FIG. 2 is a skeleton diagram showing one example of a structure of a rear drive unit.

Turning to FIG. 2, there is shown one example of a structure of the rear drive unit Pr. In the rear drive unit Pr, a pair of drive systems are arranged symmetrically in the horizontal direction to control the right rear wheel 2*r* and the left rear wheel 2*l* independently.

In the rear drive unit Pr, specifically, a right rear motor Mrr and a left rear motor Mlr are positioned symmetrically in a manner such that rotor shafts of those motors extend in the longitudinal direction of the vehicle Ve. A right drive gear 3*rr* is mounted on the rotor shaft of the right rear motor Mrr to be meshed with a right counter driven gear 4*rr*. Likewise, a left drive gear 3*lr* is mounted on the rotor shaft of the left rear motor Mlr to be meshed with a left counter driven gear 4*lr*. The right counter driven gear 4*rr* is diametrically larger than the right drive gear 3*rr*, and the left counter driven gear 4*lr* is diametrically larger than the left drive gear 3*lr*. That is, a pair of the right drive gear 3*rr* and the right counter driven gear 4*rr* serves as a speed reduction mechanism, and a pair of the left drive gear 3*lr* and the left counter driven gear 4*lr* also serves as a speed reduction mechanism. A right counter drive gear 5*rr* is arranged coaxially with the right counter driven gear 4*rr* to be rotated integrally with the right counter driven gear 4*rr*, and is meshed with a right driven gear 7*rr* as a bevel gear formed integrally on a right rear driveshaft 6*rr* connected to the right rear wheel 2*r*. Likewise, a left counter drive gear 5*lr* is arranged coaxially with the left counter driven gear 4*lr* to be rotated integrally with the left counter driven gear 4*lr*, and is meshed with a left driven gear 7*lr* as a bevel gear formed integrally on a left rear driveshaft 6*lr* connected to the left rear wheel 2*l*. A pair of the right counter drive gear 5*rr* and the right driven gear 7*rr* may also serves as a speed reduction mechanism by increasing a diameter of the right driven gear 7*rr* larger than a diameter of the right counter drive gear 5*rr*. Likewise, a pair of the left counter drive gear 5*lr* and the left driven gear 7*lr* may also serves as a speed reduction mechanism by increasing a diameter of the left driven gear 7*lr* larger than a diameter of the left counter drive gear 5*lr*.

The rear motors Mrr and Mlr, the speed reducing mechanisms, and the bevel gears are held liquid-tightly in a casing 8. In order to cool and lubricate the right rear motor Mrr and the left rear motor Mlr by oil 10*r*, the rear drive unit Pr is provided with a right rear oil pump OPrr and a left rear oil pump OPlr, each of which is an electric oil pump. Instead, the oil 10*r* may also be supplied to the right rear motor Mrr and the left rear motor Mlr by a common electric oil pump. Specifically, the right rear oil pump OPrr is arranged outside of the casing 8, and the oil 10*r* held in an oil pan 9*r* is pumped up by the right rear oil pump OPrr to be supplied to the right rear motor Mrr through a right rear cooling passage 11*rr* penetrating through the casing 8. Likewise, the left rear oil pump OPlr is also arranged outside of the casing 8, and the oil 10*r* held in an oil pan 9*r* is also pumped up by the left rear oil pump OPlr to be supplied to the left rear motor Mlr through a left rear cooling passage 11*lr* penetrating through the casing 8. Although not especially illustrated in FIG. 2, the oil 10*r* supplied to the right rear motor Mrr and the left rear motor Mlr is allowed to flow back to the oil pan 9*r* from the casing 8. As an option, an oil cooler may be arranged on each of the cooling passages 11*rr* and 11*lr*.

Figure 3:
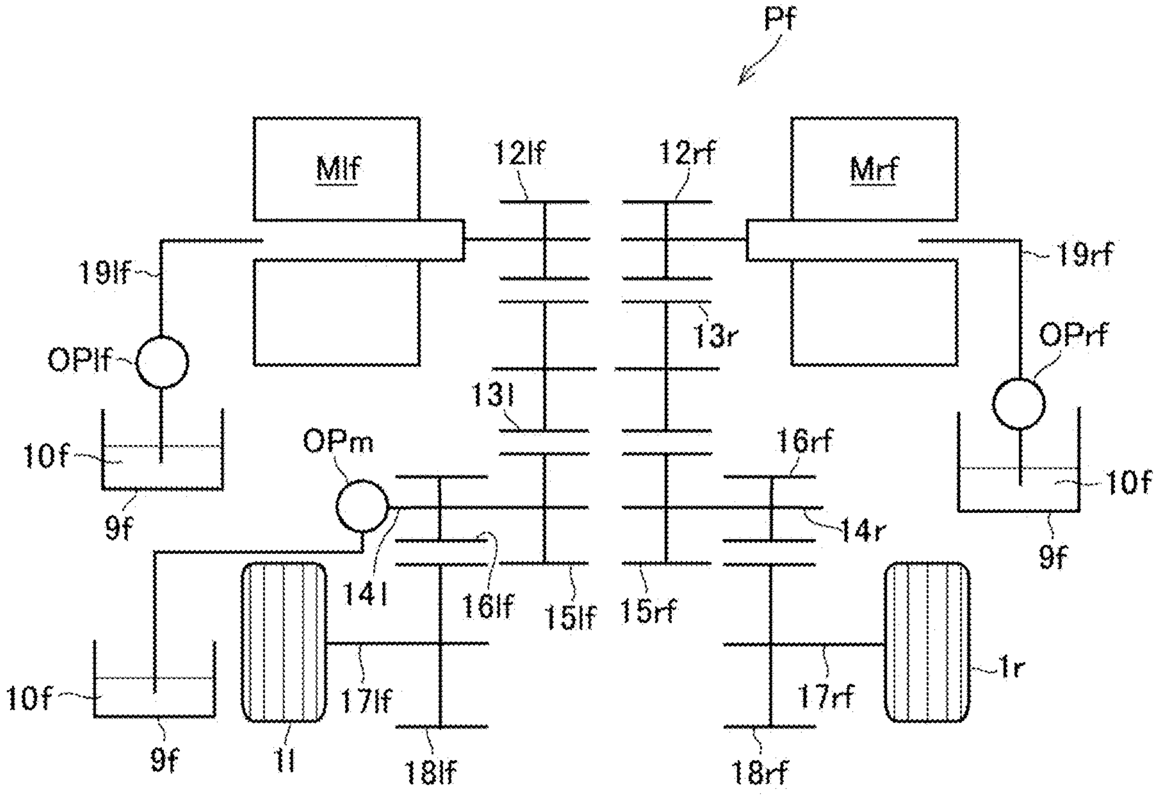
FIG. 3 is a skeleton diagram showing one example of a structure of a front drive unit.

Turning to FIG. 3, there is shown one example of a structure of the front drive unit Pf. In the front drive unit Pf, specifically, a right front motor Mrf and a left front motor Mlf are positioned symmetrically in a manner such that rotor shafts of those motors extend in the lateral (i.e., width) direction of the vehicle Ve. A right drive gear 12*rf* is mounted on the rotor shaft of the right front motor Mrf to be meshed with a right idle gear 13*r*, and the right idle gear 13*r* is also meshed with a right counter driven gear 15*rf* mounted on a right counter shaft 14*r* extending parallel to a rotational center axis of the right idle gear 13*r*. Likewise, a left drive gear 12*lf* is mounted on the rotor shaft of the left front motor Mlf to be meshed with a left idle gear 13*l*, and the left idle gear 13*l* is also meshed with a left counter driven gear 15*lf* mounted on a left counter shaft 141 extending parallel to a rotational center axis of the left idle gear 13*l*. The right counter driven gear 15*rf* is diametrically larger than the right drive gear 12*rf* mounted on the rotor shaft of the right front motor Mrf, and the left counter driven gear 15*lf* is diametrically larger than the left drive gear 12*lf* mounted on the rotor shaft of the left front motor Mlf. That is, a pair of the right drive gear 12*rf* and the right counter driven gear 15*rf* serves as a speed reduction mechanism, and a pair of the left drive gear 12*lf* and the left counter driven gear 15*lf* also serves as a speed reduction mechanism. A right counter drive gear 16*rf* is also mounted on the right counter shaft 14*r* to be meshed with a right driven gear 18*rf* formed integrally on a right front driveshaft 17*rf* connected to the right front wheel 1*r*. Likewise, a left counter drive gear 16*lf* is also mounted on the left counter shaft 141 to be meshed with a left driven gear 18*lf* formed integrally on a left front driveshaft 171*f* connected to the left front wheel 1*l*. The right driven gear 18*rf* is diametrically larger than the right counter drive gear 16*rf*, and the left driven gear 18*lf* is diametrically larger than the left counter drive gear 16*lf*. That is, a pair of the right counter drive gear 16*rf* and the right driven gear 18*rf* also serves as a speed reduction mechanism, and a pair of the left counter drive gear 16*lf* and the left driven gear 18*lf* also serves as a speed reduction mechanism.

The right front motor Mrf and the right front motor Mrf are also cooled by oil 10*f*. To this end, the front drive unit Pf is provided with a right front oil pump OPrf and a left front oil pump OPlf, each of which is an electric oil pump. Specifically, the oil 10*f* pumped up from an oil pan 9*f* by the right front oil pump OPrf is supplied to the right front motor Mrf through a right front cooling passage 19*rf*. Likewise, the oil 10*f* pumped up from an oil pan 9*f* by the left front oil pump OPlf is supplied to the left front motor Mlf through a left front cooling passage 191*f*. Although not especially illustrated in FIG. 3, the oil 10*f* supplied to the right front motor Mrf and the left front motor Mlf is allowed to flow back to the oil pan 9*f*. As an option, an oil cooler may also be arranged on each of the cooling passages 19*rf* and 191*f*. Instead, the oil 10*f* may also be supplied to the right front motor Mrf and the left front motor Mlf by a common oil pump.

In order to supply the oil 10*f* to lubrication sites such as gears and bearings, a mechanical oil pump OPm is arranged in the front drive unit Pf. As illustrated in FIG. 3, the mechanical oil pump OPm is connected to the left counter shaft 141. Therefore, the mechanical oil pump OPm is driven during propulsion of the vehicle Ve to pump up the oil 10*f* from the oil pan 9*f*, and the oil 10*f* is delivered to the above-mentioned lubrication sites including gears and bearings.

As illustrated in FIG. 1, an electric storage device (referred to as Bat in FIG. 1) 20 is electrically connected with the front drive unit Pf and the rear drive unit Pr. For example, a secondary battery such as a lithium-ion battery, an all-solid battery or the like may be adopted as the electric storage device 20. Whereas, a permanent magnet synchronous motor is adopted as each of the motors Mrf, Mlf, Mrr, and Mlr. That is, motor-generators are adopted as the motors Mrf, Mlf, Mrr, and Mlr. Specifically, the right front motor Mrf and the left front motor Mlf are connected with the electric storage device 20 through a front power controller PCf comprising an inverter, and the right rear motor Mrr and the left rear motor Mlr are connected with the electric storage device 20 through a rear power controller PCr comprising an inverter. Therefore, output torques and regenerative braking torques of the motors Mrf, Mlf, Mrr, and Mlr may be controlled independently or separately. Here, the output torques and the regenerative braking torques of the motors Mrf, Mlf, Mrr, and Mlr may be controlled by a common power controller as long as the output torques and the regenerative braking torques of those motors can be controlled independently.

Figure 4:
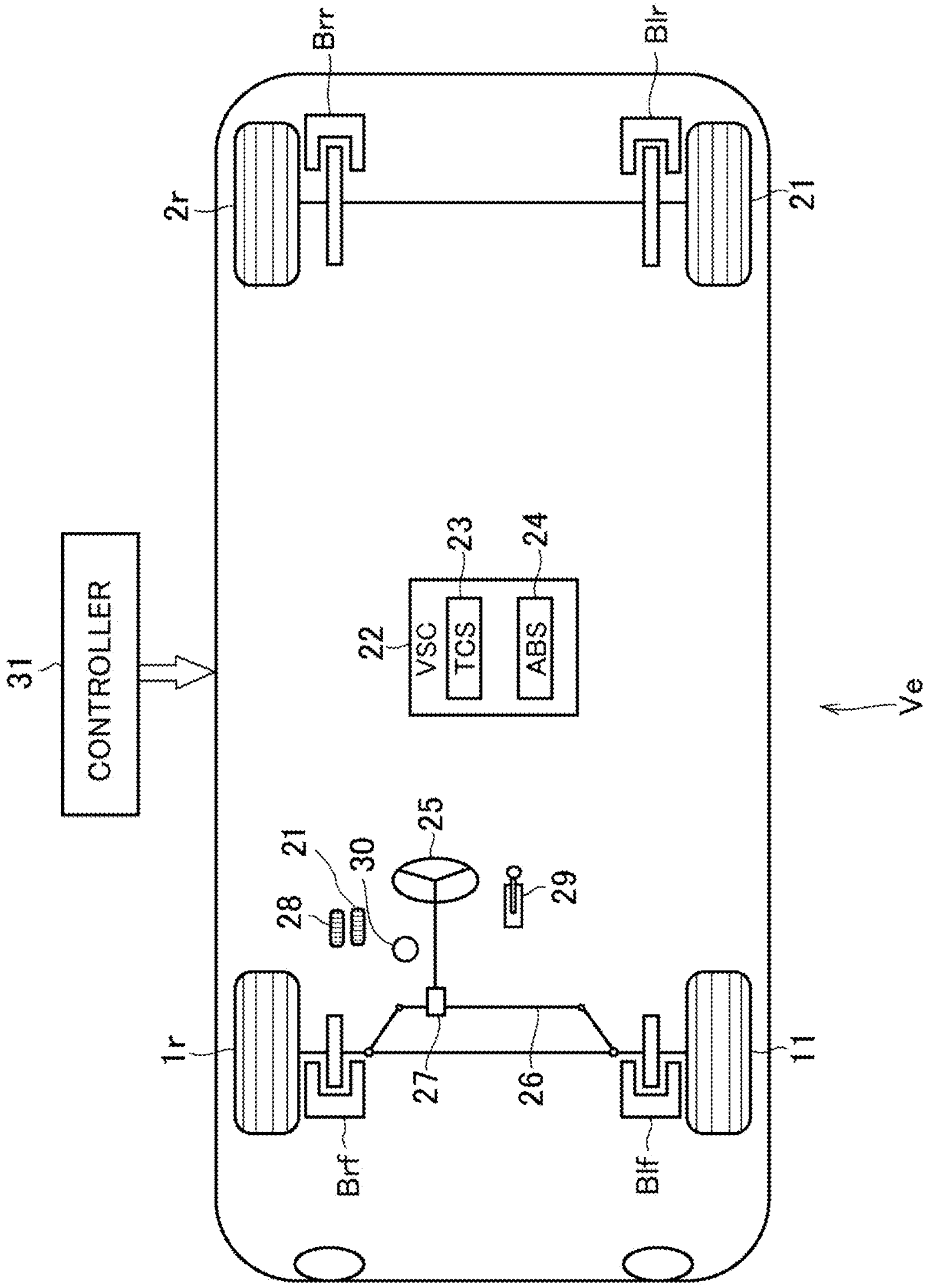
FIG. 4 is a schematic illustration showing mechanisms for propelling, stopping, and turning the electric vehicle.

Turning to FIG. 4, there are schematically shown mechanisms for propelling, stopping, and turning the vehicle Ve. As illustrated in FIG. 4, the right front wheel 1*r* is provided with a right front brake Brf, the left front wheel 1*l* is provided with a left front brake Blf, the right rear wheel 2*r* is provided with a right rear brake Brr, and the left rear wheel 2*l* is provided with a left rear brake Blr. Those brakes Brf, Blf, Brr, and Blr are electrically controlled to establish braking forces in response to an operation of a brake pedal 21. In order to electrically control the braking forces of the brakes Brf, Blf, Brr, and Blr, the vehicle Ve is provided with a vehicle stability controller (abbreviated as VSC) 22. As known in the art, the VSC 22 is a unit comprising: a traction control system (abbreviated as TCS) 23 configured to control the brakes Brf, Blf, Brr, and Blr in such a manner as to restrict driving forces of the wheels; and an anti-lock braking system (abbreviated as ABS) configured to control the braking forces of the brakes Brf, Blf, Brr, and Blr in such a manner as to prevent skid of the wheels. Therefore, when the brakes Brf, Blf, Brr, and Blr are controlled by the VSC 22, the vehicle Ve is accelerated or decelerated.

In the vehicle Ve shown in FIG. 4, the front wheels 1*r* and 1*l* are turned by a power steering module comprising a steering wheel 25, a steering linkage 26, and an actuator 27 that establishes a steering assist force.

The vehicle Ve further provided with an accelerator pedal 28 that is operated to accelerate and decelerate the vehicle Ve, a shifting device 29 that is operated to select an operating stage (i.e., a virtual speed ratio) or an operating range, and a mode selector switch 30 that is operated to select an operating mode. For example, a lever selector arranged on a floor or a center console of the vehicle Ve may be adopted as the shifting device 29. In this case, a manual position of the lever selector may be available, and when the lever selector is positioned at the manual position, the operating stage, the shift range, or the operating mode may be shifted stepwise every time the lever selector is pushed upwardly or downwardly. Whereas, a switch button may be adopted as the mode selector switch 30. For example, the switch button may be arranged in an instrumental panel, a steering wheel, or a steering column, and the operating stage, the shift range, or the operating mode may be shifted stepwise every time the switch button is operated.

The operating mode is selected to control mainly a driving torque in a desired manner. For example, the operating mode may be selected from: a normal mode in which an acceleration and an energy efficiency (i.e., an electric mileage) of the vehicle Ve are moderated; an economy mode in which the electric mileage is improved in priority to enhance the acceleration; a sports mode in which the acceleration and agility of the vehicle Ve are enhanced; a truck mode in which a turning performance of the vehicle Ve is enhanced; and a drift mode in which a driving accuracy of the vehicle Ve is enhanced. As described, the operating mode of the vehicle Ve is selected from the above-mentioned modes by operating the shifting device 29 and the mode selector switch 30. In a case that the operating mode other than the normal mode and the economy mode is selected, a driver demands a greater driving force and a greater braking force. In this case, therefore, the vehicle Ve is operated in a four-wheel drive mode in which all of the wheels 1*r*, 1*l*, 2*r*, and 2*l* are driven. In addition, the vehicle Ve may also be operated in the four-wheel drive mode when the accelerator pedal 28 or the brake pedal 21 is operated abruptly.

Although not especially shown in the accompanying drawings, in order to detect operating conditions of the vehicle Ve including a speed of the vehicle Ve and a drive demand, the vehicle Ve is provided with various kinds of sensors such as a vehicle speed sensor, an accelerator sensor, an oil temperature sensor, a steering angle sensor, a shift position sensor, a brake sensor, an operating mode sensor, a motor speed sensor, a motor temperature sensor, and so on.

The oil pumps OPrf, OPlf, OPrr, and OPlr, and the motors Mrf, Mlf, Mrr, and Mlr are controlled by a controller 31 based on the operating conditions of the vehicle Ve detected by the above-mentioned sensors. According to the exemplary embodiment of the present disclosure, the controller 31 is configured to control: speeds of the oil pumps OPrf, OPlf, OPrr, and OPlr; oil supply to each of the motors Mrf, Mlf, Mrr, and Mlr from the dedicated oil pumps OPrf, OPlf, OPrr, and OPlr; driving torques of the motors Mrf, Mlf, Mrr, and Mlr; and regenerative braking torques resulting from power generation by the motors Mrf, Mlf, Mrr, and Mlr. The controller 31 comprises a microcomputer as its main constituent, and performs calculation based on incident data, and data and programs stored in advance. Calculation results are transmitted in the form of command signals from the controller 31 to the oil pumps OPrf, OPlf, OPrr, and OPlr, and the motors Mrf, Mlf, Mrr, and Mlr. As controllers of conventional control systems for electric vehicles, an electronic control unit may be employed as the controller 31.

According to the exemplary embodiment of the present disclosure, the controller 31 is configured to control amounts of the oils 10*f* and 10*r* supplied from the oil pumps OPrf, OPlf, OPrr, and OPlr to the motors Mrf, Mlf, Mrr, and Mlr in accordance with acceleration and deceleration of the vehicle Ve. For example, when the vehicle Ve is accelerated or decelerated significantly or abruptly, levels of the oil 10*f* in the oil pan 9*f* and the oil 10*r* in the oil pan 9*r* will fluctuate. In this situation, the oil level would be lowered in the vicinity of suction inlets or strainers (neither of which are shown) of the oil pumps OPrf, OPlf, OPrr, and OPlr. In addition, the oil pumps OPrf, OPlf, OPrr, and OPlr may be operated under different loads. Therefore, the controller 31 controls amounts of the oils 10*f* and 10*r* pumped up by the motors Mrf, Mlf, Mrr, and Mlr depending on the situation. To this end, the controller 13 comprises functional devices shown in FIG. 5.

Figure 5:
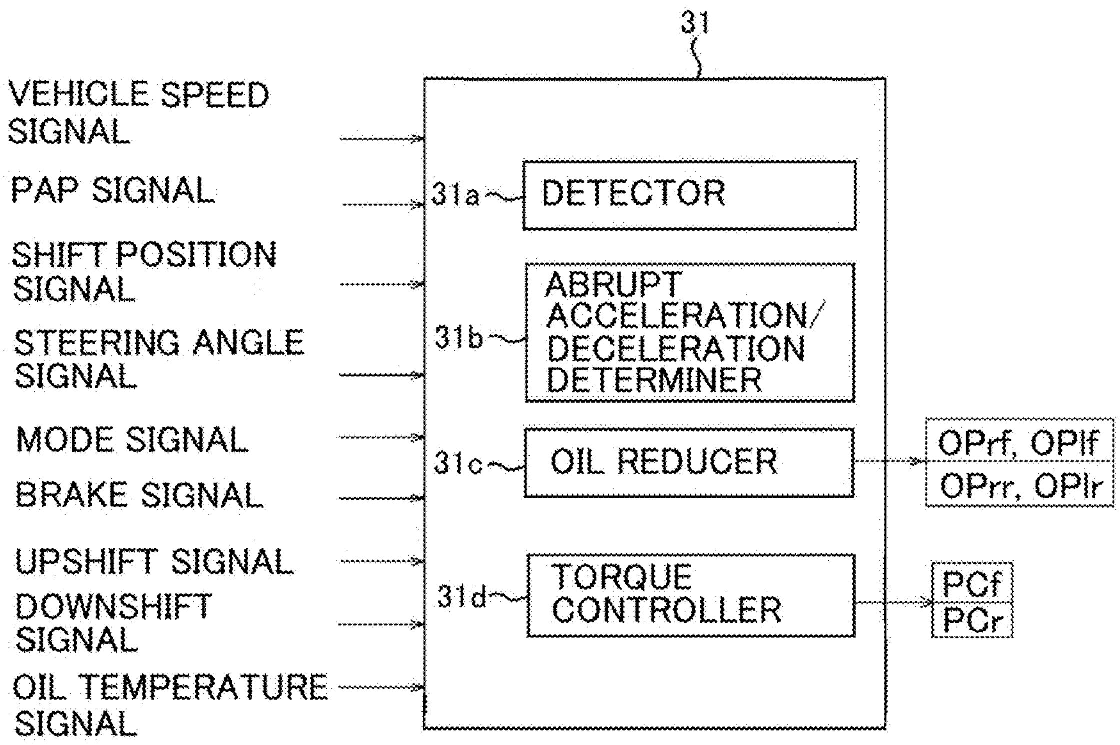
FIG. 5 is a block diagram showing functions of a controller and incident signals to the controller.

As shown in FIG. 5, the controller 31 comprises a detector 31*a* configured to detect an acceleration and a deceleration of the vehicle Ve. Specifically, a speed of the vehicle Ve detected by the vehicle speed sensor during propulsion is transmitted to the controller 31 in the form of a vehicle speed signal, and the detector 31*a* computes an acceleration or a deceleration of the vehicle Ve by differentiating the speed of the vehicle Ve detected by the vehicle speed sensor. Otherwise, if the vehicle Ve is provided with an acceleration sensor, an acceleration or a deceleration of the vehicle Ve detected by the acceleration sensor is transmitted to the detector 31*a*. The controller 31 further comprises an abrupt acceleration/deceleration determiner 31*b* configured to determine that the vehicle Ve is accelerated or decelerated abruptly based on the acceleration or deceleration detected by the detector 31*a*. According to the exemplary embodiment of the present disclosure, a definition of the "abrupt" acceleration or deceleration is a change in a speed of the vehicle Ve by which levels of the oil 10*f* in the oil pan 9*f* and the oil 10*r* in the oil pan 9*r* is changed by the force of inertia to an extent which might disturb the oil pumps OPrf, OPlf, OPrr, and OPlr in pumping up the oils 10*f* and 10*r*. In order to determine such abrupt acceleration and deceleration, a threshold of the abrupt acceleration and a threshold of the abrupt deceleration are set in advance, and the abrupt acceleration/deceleration determiner 31*b* determines that the vehicle Ve is accelerated or decelerated abruptly when the acceleration or deceleration of the vehicle Ve detected by the detector 31*a* exceeds the threshold value.

The controller 31 further comprises an oil reducer 31*c* configured to reduce amounts of the oils 10*f* and 10*r* pumped up by the oil pumps OPrf, OPlf, OPrr, and OPlr, or amounts of the oils 10*f* and 10*r* supplied to the motors Mrf, Mlf, Mrr, and Mlr. The oil pumps to be controlled to reduce the pumping amount are selected depending whether the vehicle Ve is accelerated abruptly or decelerated abruptly. For example, when the vehicle Ve is accelerated abruptly, amounts of the oil 10*f* pumped up by the front oil pumps OPrf and OPlf, or amounts of the oil 10*f* supplied to the front motors Mrf and Mlf are reduced. By contrast, when the vehicle Ve is decelerated abruptly, amounts of the oil 10*r* pumped up by the rear oil pumps OPrr and OPlr, or amounts of the oil 10*r* supplied to the rear motors Mrr and Mir are reduced. In either case, the amounts of the oil pumped up by the oil pumps or the amounts of the oil supplied to the motors may be reduced by reducing suction amounts of the oil pumps or stopping oil supply from the oil pumps to the motors. To this end, specifically, speeds of the front oil pumps OPrf and OPlf or the rear oil pumps OPrr and OPlr are reduced. For example, reduction amounts of the oil supplied to the motors and reduction amounts of the speed of the oil pumps may be set to constant values. Otherwise, reduction amounts of the oil supplied to the motors and reduction amounts of the speed of the oil pumps may be altered in accordance with the acceleration or deceleration of the vehicle Ve. The oil reducer 31*c* transmits the reduction amounts of the oil supplied to the motors or the reduction amounts of the speed of the oil pumps thus determined to the front oil pumps OPrf and OPlf or the rear oil pumps OPrr and OPlr in the form of signals.

The controller 31 further comprises a torque controller 31*d* configured to reduce loads on the motors (i.e., output torques or regenerative braking torques of the motors) where the oil supply thereto is reduced. For example, when the vehicle Ve is accelerated abruptly, the vertical component of the force acting on each of the front wheels 1*r* and 1*l* is reduced. In this case, as described above, the amounts of the oil 10*f* supplied from the front oil pumps OPrf and OPlf to the front motors Mrf and Mlf are reduced. That is, the front motors Mrf and Mlf may not be cooled as in the normal condition. In this case, therefore, the torque controller 31*d* reduces driving torques delivered to the front wheels 1*r* and 1*l* less than driving torques delivered to the rear wheels 2*r* and 2*l*. That is, the torque controller 31*d* reduces output torques of the front motors Mrf and Mlf less than output torques of the rear motors Mrr and Mlr. By contrast, when the vehicle Ve is decelerated abruptly, the vertical component of the force acting on each of the rear wheels 2*r* and 2*l* is reduced. In this case, as described above, the amounts of the oil 10*r* supplied from the rear oil pumps OPrr and OPlr to the rear motors Mrr and Mlr are reduced. That is, the rear motors Mrr and Mlr may not be cooled as in the normal condition. In this case, therefore, the torque controller 31*d* reduces braking torques applied to the rear wheels 2*r* and 2*l* less than braking torques applied to the front wheels 1*r* and 1*l*. That is, regenerative torques established by the rear motors Mrr and Mlr are reduced thereby reducing loads on the rear motors Mrr and Mlr. For these purposes, reduction amounts of the torques of the motors Mrf, Mlf, Mrr, and Mlr may be set to constant values. Otherwise, reduction amounts of the torques of the motors Mrf, Mlf, Mrr, and Mlr may be altered in accordance with reductions in cooling performances of the oil pumps OPrf, OPlf, OPrr, and OPlr. The torque controller 31*d* transmits the reduction amounts of the torques of the motors Mrf, Mlf, Mrr, and Mlr thus determined to the power controllers PCf and PCr.

In order to execute the above-explained controls, various data is transmitted to the controller 31. For example, the controller 31 receives a vehicle speed signal representing a speed of the vehicle Ve, a PAP signal representing a position of the accelerator pedal 28, a shift position signal representing a position of the shifting device 29, a steering angle signal representing a rotational angle of the steering wheel 25 etc. Specifically, the speed of the vehicle Ve may be detected by detecting a rotational speed of a rotary member, e.g., any one of the driveshafts 6 and 17. The position of the accelerator pedal 28 may be detected by detecting an angle of the accelerator pedal 28 or a pedal force applied to the accelerator pedal 28. That is, the signal representing the position of the accelerator pedal 28 also represents a required driving force. The shift position may be selected from e.g., a drive (D) position in which the vehicle Ve is operated in the normal mode, the manual position in which e.g., an operating stage is shifted stepwise by manually operating the shifting device 29, and a brake (B) position. In addition, the shift range or the operating range may be selected from e.g., an L range and a second (2) range in which a relatively greater driving torque is maintained at a high speed range. Therefore, the signals representing the shift position and the shift range or the operating range selected by the shifting device 29 are transmitted to the controller 31, for the purpose of selecting the four-wheel drive mode when a position in which the driving torque is limited or an engine braking force is required is selected. The steering angle may be detected by detecting a rotational angle of the steering wheel 25, and the signal representing the steering angle is transmitted to the controller 31 when the vehicle Ve is making a turn. As described, in the vehicle Ve, the torques of the wheels 1*r*, 1*l*, 2*r*, and 2*l* may be controlled independently. Therefore, in order to enhance a turning performance of the vehicle Ve by controlling the torques of the wheels 1*r*, 1*l*, 2*r*, and 2*l* independently, the signal representing the steering angle is transmitted to the controller 31.

In addition, the controller 31 also receives a mode signal representing a selected mode, a brake signal, an upshift (+) signal, a downshift (−) signal, and an oil temperature signal. As described, in the operating mode other than the normal mode and the economy mode, an accelerating performance (i.e., agility) and a turning performance are enhanced on a priority basis. For this purpose, the driving torques and the braking torques of the wheels 1*r*, 1*l*, 2*r*, and 2*l* are controlled independently or separately. Therefore, in order to determine the selection of the operating mode in which the accelerating performance and the turning performance are enhanced, the signal representing an operating mode selected by the mode selector switch 30 is transmitted to the controller 31. Specifically, the brake signal is transmitted to the controller 31 when the brake pedal 21 is depressed in accordance with a depression or a pedal force applied to the brake pedal 21. In addition, the brake signal is also transmitted when the braking force established by the brakes Brf, Blf, Brr, and Blr are controlled by the VSC 22. Therefore, the abrupt deceleration of the vehicle Ve may be determined based on the brake signal.

The upshifting (+) signal and the downshifting (−) signal are transmitted when the shift range or the operating stage is shifted manually. For example, in a case that the lever selector of the shifting device 29 is positioned at the manual position, the upshifting (+) signal is transmitted when the lever selector is moved to an upshifting position, and the downshifting (−) signal is transmitted when the lever selector is moved to a downshifting position. Otherwise, in a case that the manual range is selected, the upshifting (+) signal is transmitted when an upshifting switch arranged e.g., in the steering wheel 25 is operated, and the downshifting (−) signal is transmitted when a downshifting switch also arranged e.g., in the steering wheel 25 is operated. Likewise, in a case that a paddle shifter is arranged e.g., behind the steering wheel 25, the upshifting (+) signal is transmitted when an upshifting paddle is pulled, and the downshifting (−) signal is transmitted when a downshifting paddle is pulled. Basically, the driver shifts the shift range or the operating stage for the purpose of enhancing acceleration, power performance, and turning performance of the vehicle Ve compared to those in the normal mode. For this purpose, it is preferable to operate the vehicle Ve in the four-wheel drive mode, and hence the upshifting (+) signal and the downshifting (−) signal are transmitted to the controller 31 so as to shift the operating mode to the four-wheel drive mode. In addition, in order to control oil supply quantities from the oil pumps OPrf, OPlf, OPrt, and OPlr and speeds of those oil pumps, signals representing temperatures of the oils 10*f* and 10*r* are transmitted to the controller 31.

Figure 6:
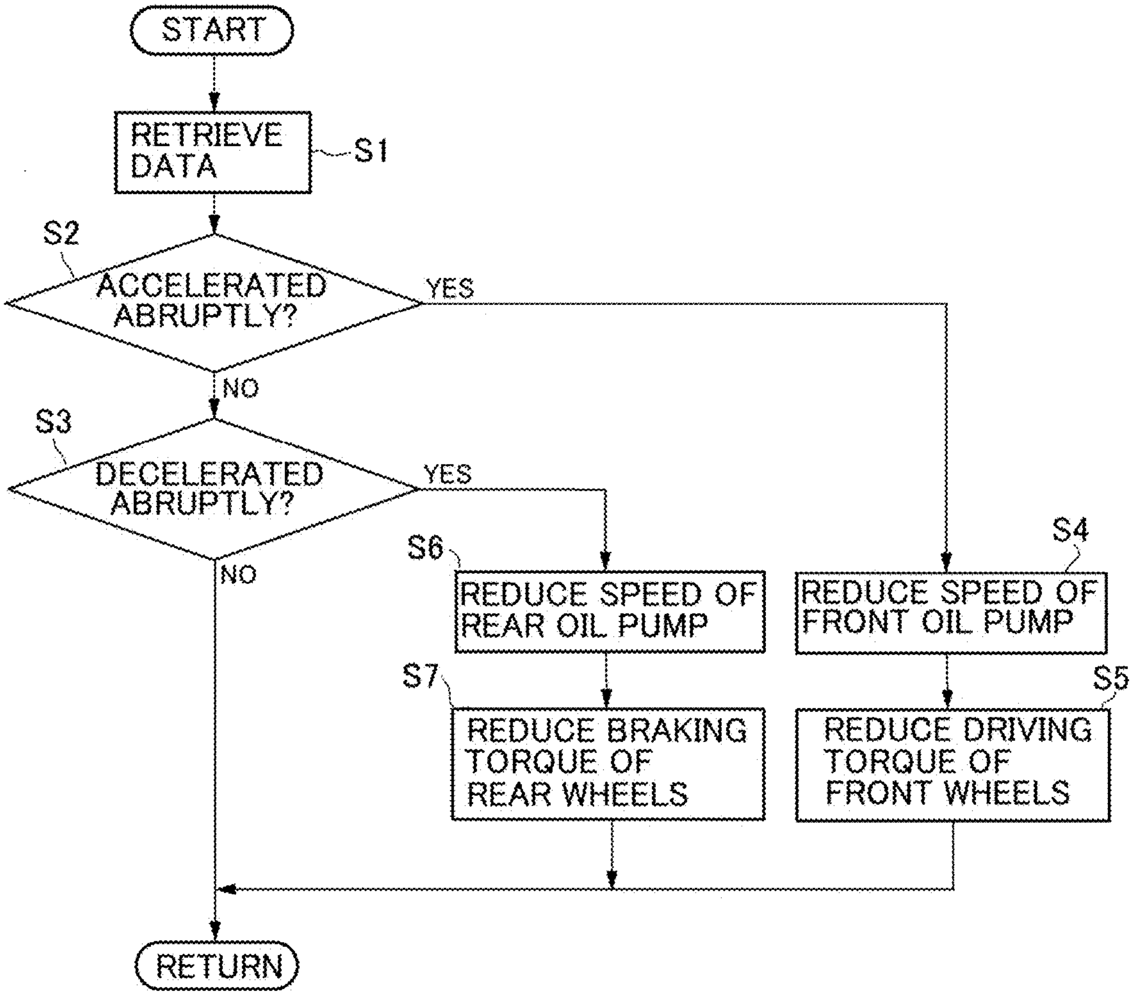
FIG. 6 is a flowchart showing one example of a routine executed by the control system according to the exemplary embodiment of the present disclosure.

Turning to FIG. 6, there is shown one example of a routine executed by the controller 31 when the vehicle Ve is accelerated or decelerated abruptly. Specifically, the routine shown in FIG. 6 is executed repeatedly as long as the vehicle Ve is propelled in the four-wheel-drive mode while operating the oil pumps OPrf, OPlf, OPrr, and OPlr to pump up the oils 10*f* and 10*r*. In this situation, the driving torques and the regenerative braking torques of the wheels 1*r*, 1*l*, 2*r*, and 2*l* are controlled in accordance with a speed of the vehicle Ve and a drive demand by a dedicated drive control system of the four-wheel drive layout vehicle. At step S1, the controller 31 retrieves necessary data. For example, at step S1, the controller 31 collects data relating to a position of the accelerator pedal 28, a speed of the vehicle Ve, temperatures of the motors Mrf, Mlf, Mrr, and Mlr, temperatures of the oils 10*f* and 10*r*, a shift range and so on. Then, it is determined at step S2 whether the vehicle Ve is accelerated abruptly, and it is determined at step S3 whether the vehicle Ve is decelerated abruptly. As described, such determinations may be made by determining whether the detected acceleration or deceleration is greater than the predetermined threshold value. To this end, absolute values of the threshold value of acceleration and the threshold value of deceleration may be set not only to a same value but also to different values. Here, it is to be noted that the order of steps S2 and S3 may be switched arbitrarily.

If the vehicle Ve is accelerated abruptly, that is, if the acceleration of the vehicle Ve is greater than the threshold value so that the answer of step S2 is YES, the routine progresses to step S4 to reduce rotational speeds of the front oil pumps OPrf and OPlf. In this case, therefore, an amount of the oil 10*f* pumped up from the oil pan 9*f* by the front oil pumps OPrf and OPlf is reduced. Consequently, amounts of oil supply to the front motors Mrf and Mlf driving the front wheels 1*r* and 1*l* are reduced.

Then, at step S5, the driving torques delivered to the front wheels 1*r* and 1*l* are reduced less than the driving torques delivered to the rear wheels 2*r* and 2*l*, and thereafter the routine returns. In the situation where the vehicle Ve is accelerated abruptly, the vertical component of the force acting on each of the front wheels 1*r* and 1*l* is reduced. Therefore, the output torques of the front motors Mrf and Mlf are reduced less than the output torques of the rear motors Mrr and Mlr so that the driving torques delivered to the front wheels 1*r* and 1*l* are reduced less than the driving torques delivered to the rear wheels 2*r* and 2*l*. Consequently, loads on the front motors Mrf and Mlf are reduced lighter than loads on the rear motors Mrr and Mlr. In this case, it is not necessary to cool the front motors Mrf and Mlf as intensely as the rear motors Mrr and Mlr. That is, a cooling requirement of each of the front motors Mrf and Mlf is reduced less than a cooling requirement of each of the rear motors Mrr and Mlr, therefore, amounts of oil supply to the front motors Mrf and Mlf are reduced. In this situation, since the vehicle Ve is accelerated abruptly, an oil level in the oil pan 9*f* is fluctuated by the force of inertia, and hence the oil level in the oil pan 9*f* would be lowered in the vicinity of the suction inlets of the front oil pumps OPrf and OPlf. However, since the amount of the oil 10*f* pumped up by the front oil pumps OPrf and OPlf is reduced, the oil level in the oil pan 9*f* will not be further lowered. For this reason, ingestion of air into the front oil pumps OPrf and OPlf may be reduced or prevented.

In addition, since the output torques of the front motors Mrf and Mlf are reduced to reduce the driving torques delivered to the front wheels 1*r* and 1*l*, heat generation of the front motors Mrf and Mlf may be suppressed. For this reason, temperatures of the front motors Mrf and Mlf will not be raised excessively in spite of the fact that amounts of the oil 10*f* supplied thereto are reduced. Here, a required driving force to propel the vehicle Ve is calculated based on a speed on the vehicle Ve and a position of the accelerator pedal 28, and the driving torques of the wheels 1*r*, 1*l*, 2*r*, and 2*l* are controlled in such a manner as to achieve the required driving force. Therefore, when the driving torques delivered to the front wheels 1*r* and 1*l* are reduced, the driving torques delivered to the rear wheels 2*r* and 2*l* are increased to achieve the required driving force to propel the vehicle Ve.

By contrast, if the acceleration of the vehicle Ve is equal to or less than the threshold value so that the answer of step S2 is NO, the routine progresses to step S3 to determine whether the vehicle Ve is decelerated abruptly. If the deceleration of the vehicle Ve is greater than the threshold value so that the answer of step S3 is YES, the routine progresses to step S6 to reduce rotational speeds of the rear oil pumps OPrr and OPlr. In this case, therefore, an amount of the oil 10*r* pumped up from the oil pan 9*r* by the rear oil pumps OPrr and OPlr is reduced. Consequently, amounts of oil supply to the rear motors Mrr and Mlr driving the rear wheels 2*r* and 2*l* are reduced.

Then, at step S7, the braking forces applied to the rear wheels 2*r* and 2*l* are reduced less than the braking force applied to the front wheels 1*r* and 1*l*, and thereafter the routine returns. In the situation where the vehicle Ve is decelerated abruptly, the vertical component of the force acting on each of the rear wheels 2*r* and 2*l* is reduced. Therefore, in order to regenerate energy efficiently by the front wheels 1*r* and 1*l*, the braking forces applied to the rear wheels 2*r* and 2*l* are reduced less than the braking force applied to the front wheels 1*r* and 1*l*. To this end, the regenerative braking torques of the rear motors Mrr and Mlr are reduced less than the regenerative braking torques of the front motors Mrf and Mlf. Consequently, loads on the rear motors Mrr and Mlr are reduced lighter than loads on the front motors Mrf and Mlf. In this case, it is not necessary to cool the rear motors Mrr and Mlr as intensely as the front motors Mrf and Mlf. That is, a cooling requirement of each of the rear motors Mrr and Mlr is reduced less than a cooling requirement of each of the front motors Mrf and Mlf, therefore, amounts of oil supply to the rear motors Mrr and Mlr are reduced. In this situation, since the vehicle Ve is decelerated abruptly, an oil level in the oil pan 9*r* is fluctuated by the force of inertia, and hence the oil level in the oil pan 9*r* would be lowered in the vicinity of the suction inlets of the rear oil pumps OPrr and OPlr. However, since the amount of the oil 10*r* pumped up by the rear oil pumps OPrr and OPlr is reduced, the oil level in the oil pan 9*r* will not be further lowered. For this reason, ingestion of air into the rear oil pumps OPrr and OPlr may be reduced or prevented.

In addition, since the regenerative braking torques of the rear motors Mrr and Mlr are reduced to reduce the braking forces applied to the rear wheels 2*r* and 2*l*, heat generation of the rear motors Mrr and Mlr may be suppressed. For this reason, temperatures of the rear motors Mrr and Mir will not be raised excessively in spite of the fact that amounts of the oil 10*r* supplied thereto are reduced. Here, a required braking force to decelerate the vehicle Ve is calculated based on an operating amount of the brake pedal 21, and the braking forces applied to the wheels 1*r*, 1*l*, 2*r*, and 2*l* are controlled in such a manner as to achieve the required braking force. Therefore, when the braking forces applied to the rear wheels 2*r* and 2*l* are reduced, the braking forces applied to the front wheels 1*r* and 1*l* are increased to achieve the required braking force to decelerate the vehicle Ve.

By contrast, if the vehicle is not decelerated abruptly so that the answer of step S3 is NO, the routine returns. In this case, the operating mode of the vehicle Ve is selected from the two-wheel drive mode and the four-wheel drive mode depending on a traveling condition of the vehicle Ve such as a speed of the vehicle Ve and a position of the accelerator pedal 28 or an operating amount of the brake pedal 21. In addition, the driving forces to drive the wheels 1*r*, 1*l*, 2*r*, and 2*l*, the braking forces applied to the wheels 1*r*, 1*l*, 2*r*, and 2*l*, and the output torques and the regenerative braking torques of the motors Mrf, Mlf, Mrr, and Mlr are controlled by the dedicated drive control system of the four-wheel drive layout vehicle.

What is claimed is:

1. A cooling control system for an electric vehicle, comprising:

a first motor that drives front wheels;

a first oil pump that supplies oil to the first motor;

a second motor that drives rear wheels; and a second oil pump that supplies oil to the second motor, wherein a load on the second motor is increased greater than a load on the first motor when the electric vehicle is accelerated, the load on the first motor is increased greater than the load on the second motor when the electric vehicle is decelerated, the cooling control system comprising:

a controller that controls the first oil pump and the second oil pump, wherein the controller comprises:

a detector that is configured to detect at least any one of acceleration and deceleration of the electric vehicle while the electric vehicle is propelled by the first motor and the second motor;

an abrupt acceleration/deceleration determiner that is configured to determine that the acceleration or the deceleration detected by the detector is greater than a predetermined threshold value; and an oil reducer that is configured to reduce an amount of the oil supplied from one of the first oil pump and the second oil pump which supplies the oil to one of the first motor and the second motor where the lighter load than the load on another of the motors is applied, when the abrupt acceleration/deceleration determiner determines that the acceleration or the deceleration is greater than the threshold value.

2. The cooling control system for the electric vehicle as claimed in claim 1, wherein the first motor and the second motor include a motor-generator, and the load includes: output torques of the first motor and the second motor; and regenerative braking torques resulting from power generation by the first motor and the second motor.

3. The cooling control system for the electric vehicle as claimed in claim 2, wherein the oil reducer is further configured to reduce the amount of the oil supplied from the first oil pump to the first motor when the abrupt acceleration/deceleration determiner determines that the acceleration is greater than the threshold value.

4. The cooling control system for the electric vehicle as claimed in claim 2, wherein the oil reducer is further configured to reduce the amount of the oil supplied from the second oil pump to the second motor when the abrupt acceleration/deceleration determiner determines that the deceleration is greater than the threshold value.

5. The cooling control system for the electric vehicle as claimed in claim 2, wherein the oil reducer is further configured to reduce the amount of the oil supplied to the one of the first motor and the second motor by reducing a speed of the one of the first oil pump and the second oil pump.

6. The cooling control system for the electric vehicle as claimed in claim 2, wherein the controller further comprises a torque controller that is configured to reduce the output torque of the first motor when the amount of the oil supplied from the first oil pump to the first motor is reduced.

7. The cooling control system for the electric vehicle as claimed in claim 2, wherein the controller further comprises a torque controller that is configured to reduce the output torque of the second motor when the amount of the oil supplied from the second oil pump to the second motor is reduced.

8. The cooling control system for the electric vehicle as claimed in claim 1, wherein the oil reducer is further configured to reduce the amount of the oil supplied from the first oil pump to the first motor when the abrupt acceleration/deceleration determiner determines that the acceleration is greater than the threshold value.

9. The cooling control system for the electric vehicle as claimed in claim 1, wherein the oil reducer is further configured to reduce the amount of the oil supplied from the second oil pump to the second motor when the abrupt acceleration/deceleration determiner determines that the deceleration is greater than the threshold value.

10. The cooling control system for the electric vehicle as claimed in claim 1, wherein the oil reducer is further configured to reduce the amount of the oil supplied to the one of the first motor and the second motor by reducing a speed of the one of the first oil pump and the second oil pump.

11. The cooling control system for the electric vehicle as claimed in claim 1, wherein the controller further comprises a torque controller that is configured to reduce an output torque of the first motor when the amount of the oil supplied from the first oil pump to the first motor is reduced.

12. The cooling control system for the electric vehicle as claimed in claim 1, wherein the controller further comprises a torque controller that is configured to reduce an output torque of the second motor when the amount of the oil supplied from the second oil pump to the second motor is reduced.

* * * * *